United States Patent
Wright et al.

(10) Patent No.: US 9,471,591 B2
(45) Date of Patent: Oct. 18, 2016

(54) ITERATIVE DISK UPLOAD BASED ON DIFFERENCING DISK FORMAT

(75) Inventors: Eron D. Wright, Sammamish, WA (US); Ismet Erensoy Kahraman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 768 days.

(21) Appl. No.: 13/462,452

(22) Filed: May 2, 2012

(65) Prior Publication Data
US 2013/0297867 A1    Nov. 7, 2013

(51) Int. Cl.
*G06F 17/30* (2006.01)
*G06F 9/455* (2006.01)

(52) U.S. Cl.
CPC ..... *G06F 17/30194* (2013.01); *G06F 9/45558* (2013.01)

(58) Field of Classification Search
CPC ................ G06F 9/45558; G06F 2009/45562; G06F 2009/4557; G06F 2009/45575; G06F 2009/45579; G06F 2009/45583; G06F 2009/45595
See application file for complete search history.

(56) References Cited

U.S. PATENT DOCUMENTS

| | | | |
|---|---|---|---|
| 7,447,854 B1 | 11/2008 | Cannon | |
| 2008/0256314 A1* | 10/2008 | Anand | G06F 11/1451 711/162 |
| 2010/0042796 A1 | 2/2010 | Vasilevsky et al. | |
| 2011/0119668 A1 | 5/2011 | Calder et al. | |
| 2011/0196822 A1 | 8/2011 | Zunger et al. | |
| 2012/0192175 A1* | 7/2012 | Dorai | G06F 9/45558 718/1 |
| 2012/0215998 A1* | 8/2012 | Sharp et al. | 711/162 |
| 2012/0233522 A1* | 9/2012 | Barton et al. | 714/758 |

OTHER PUBLICATIONS

Hofstetter, Walter, "XenClient—Disk Management—VHD Files and Chains", Published on: Jan. 17, 2011, Available at: http://blogs.citrix.com/2011/01/17/xenclient-disk-management-vhd-files-and-chains/.
Petri, Daniel, "Creating Differencing Disks with Microsoft Virtual PC", Published on: Jan. 8, 2009, Available at: http://www.petri.co.il/virtual_creating_differencing_disks_with.htm.
Abdullin, Rinat, "Use MD5 Hashing for your Windows Azure Blob Operations", Published on: Nov. 8, 2010, Available at: http://abdullin.com/journal/2010/11/8/use-md5-hashing-for-your-windows-azure-blob-operations.html.
Brad Calder et al. "Windows Azure Storage: A Highly Available Cloud Storage Service with Strong Consistency", Operating Systems Principles, ACM, Oct. 23, 2011, pp. 143-157.
Hrishikesh Dewan et al., "A Survey of Cloud Storage Facilities", Services (Services), 2011 IEEE World Congress on, IEEE, Jul. 4, 2011, pp. 224-231.
Andersen et al., "Hitachi Universal storage Platform Family Best Practices with Hyper-V", Hitachi Storage Solutions, Apr. 2009, pp. 1-27.

* cited by examiner

*Primary Examiner* — Ryan Bertram
(74) *Attorney, Agent, or Firm* — Ben Tabor; Doug Barker; Micky Minhas

(57) ABSTRACT

Updating a remote storage data set. A method includes, from a local service providing a hint of a remote storage data set that may exist at a remote service. An indication is received from the remote service that the remote storage data set exists at the remote service. The method includes requesting that the remote storage data set be copied at the remote service to a copy of the remote storage data set. A change to be applied to the copy of the remote storage data set is sent to the remote service.

20 Claims, 5 Drawing Sheets

ITERATIVE DISK UPLOAD BASED ON DIFFERENCING DISK FORMAT

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

The connections allow a computing system to access services at other computing systems and to quickly and efficiently receive application data from other computing systems. Further, interconnected computing systems can be used to implement cluster computing systems where several discrete systems work together to accomplish a computing task assigned to the cluster as a whole. Some such systems may have all, or a portion of the cluster deployed in the cloud. Cloud computing allows for computing resources to be provided as services rather than a deliverable product. In particular, computing power, software, information, etc. are provided (for example, through a rental agreement) over a network, such as the Internet.

To use cloud computing, a user uploads their data to a cloud system, such as Windows Azure® from Microsoft® Corporation, or Amazon EC2 available from Amazon.com Inc. of Seattle Wash. Virtual machines are then set-up for the user at the cloud system using the user's uploaded data.

Uploading a virtual hard disk may be a time-consuming task. For operating system images, 10 GB or more is typically transferred. Often, the disk is subsequently refreshed with additional data. Refreshing may include, for example operating system patching, application updates, and troubleshooting boot issues. It may be that the original data not be re-transmitted, for example, to conserve network bandwidth.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method of updating a remote storage data set. The method includes, from a local service providing a hint of a remote storage data set that may exist at a remote service. An indication is received from the remote service that the remote storage data set exists at the remote service. The method includes requesting that the remote storage data set be copied at the remote service to a copy of the remote storage data set. A change to be applied to the copy of the remote storage data set is sent to the remote service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

In this description and the following claims, "cloud computing" is defined as a model for enabling ubiquitous, convenient, on-demand network access to a shared pool of configurable computing resources (e.g., networks, servers, storage, applications, and services) that can be provisioned and released with reduced management effort or service provider interaction. A cloud model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud systems, such as the Windows Azure® cloud do not natively support differencing disk technology. Thus optimizations for iterative upload may be carried out by tooling. By leveraging differencing disks locally on-premises, cloud storage primitives, and the semantics of the cloud-based image repository, an upload tool can enable a patch, update, or other minimized data upload capability.

Figure 1:
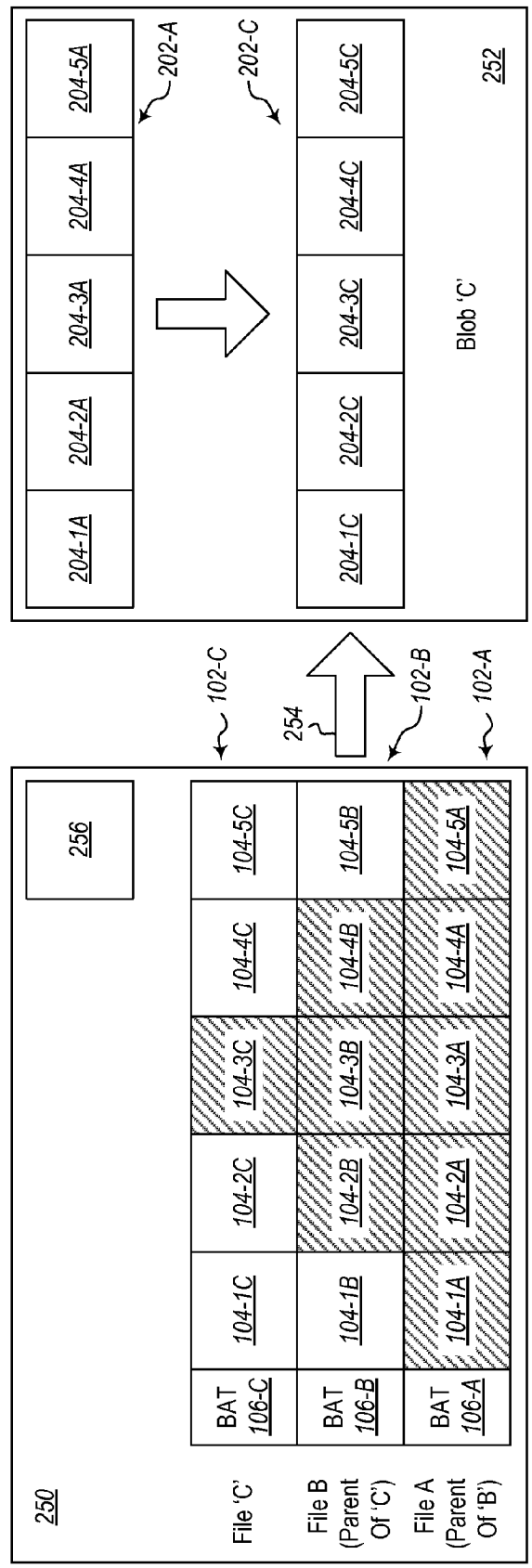
FIG. 1 illustrates a differencing virtual hard disk.

An example is now illustrated. Referring now to FIG. 1, the user creates file 102-A locally on premises at a local service 250, and uploads it as blob 202-A to a remote service 252 by using an upload tool. Later, the user wishes to refresh the content. First, the user creates file 102-B and 102-C as differencing disks over file 102-A and 102-B respectively. Differencing disk formats will be discussed in more detail below. However, in the example illustrated, a hierarchical differencing structure may include elements corresponding to blobs at a remote service. For example, the level including the disk 102-A corresponds to the blob 202-A. When the user invokes the upload tool, the user supplies the location of blob 202-A as a hint. The remote service 252 can indicate the presence of the blob 202-A. As a result, the upload tool proceeds to create blob 202-C by remotely copying blob 202-A to blob 202-C and then uploads only the difference content of file 102-B and 102-C. In particular, blocks 104-2B, 104-3C, 104-4B are uploaded. The net effect is that blob 202-C contains the same content as it would if the upload had been performed without the hint and by simply uploading the entirety of the file 102-C by flattening the hierarchy of files. At this point the hierarchical differencing structure at the local service 250 also includes a hierarchical level, including disk 102-C, that corresponds to the blob 202-C at the remote service 252.

Embodiments may include virtual hard disk format support. For example, the ability to iteratively construct a remote virtual hard disk is made possible by parsing the differencing disk format, identifying the origin of a given block of data, then optimizing as appropriate.

Embodiments may include functionality for leveraging storage. As per the previous example, embodiments can initialize blob 202-C with the contents of blob 202-A, then proceed to mutate blob 202-C.

Embodiments may include functionality for ensuring integrity. Ensuring the integrity of the disk is useful for avoiding expensive live-site investigations. Two mechanisms that may be used in some embodiments to ensure the integrity of a patch operation will now be illustrated. First, embodiments check that the local base file (e.g. file 102-A in the example illustrated above) has not been mutated since it was uploaded. This may be performed in some embodiments by calculating a hash of the local file, and comparing it to a hash recorded created when the local file was first uploaded as the blob 202-A. The hash record created when the local file was first uploaded is stored as metadata on the remote blob (i.e. blob 202-A).

Second, embodiments may rely on the semantics of a cloud image repository. When a given disk file is uploaded to the cloud, it may be registered with the platform as an 'image' for use in virtual machine provisioning. The platform retains an exclusive lease on the blob after that point, ensuring a read-only semantic. The upload tool at the local service 250 may then assume that the blob has not been mutated.

While tools exist to convert a variety of disk formats into prescribed formats for cloud services, some embodiments described herein integrate conversion into the platform-supplied upload tool. The conversion occurs on-the-fly while the upload proceeds. This may provide efficiency and convenience for the user.

Figure 2:
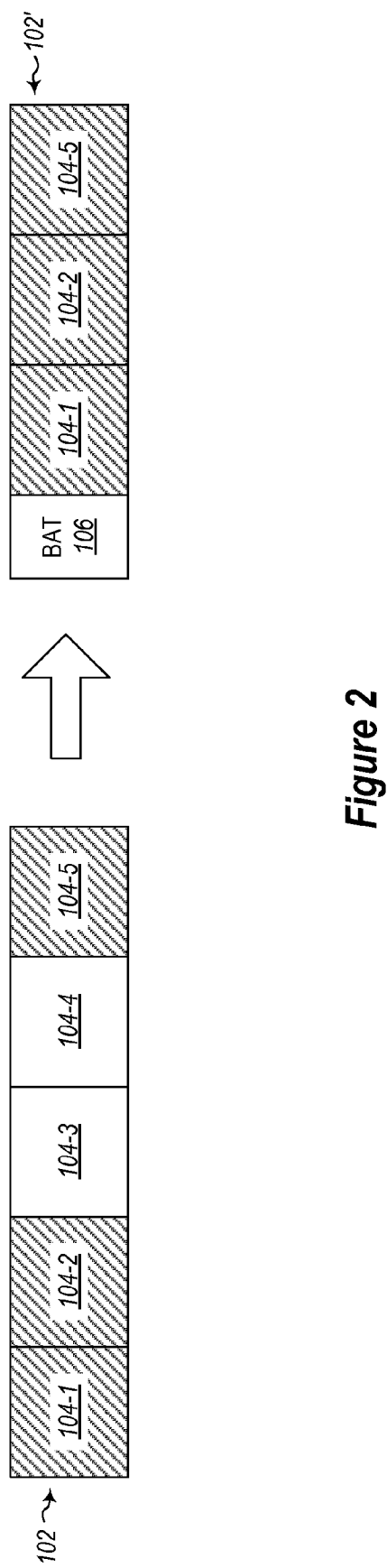
FIG. 2 illustrates a representation of virtual hard disks including one with sparseness optimizations and one without sparseness optimizations.

An aspect of virtual hard disks is that the content is typically sparse. That is, the virtual stream of information contains large pockets of emptiness. An example is illustrated in FIG. 2. FIG. 2 illustrates a representation of a virtual hard disk 102. The virtual hard disk 102 includes five blocks 104-1 through 104-5. Three of the blocks 104-1, 104-2, and 104-5 contain data. The other two blocks 104-3 and 104-4 contain null data. A sparseness optimization can be performed to create the virtual hard disk 102' as a dynamic virtual hard disk, rather than the un-optimized virtual hard disk 102. The virtual hard disk 102' includes the three blocks containing data 104-1, 104-2, and 104-5 and a block allocation table (BAT) 106. The BAT 106 can be used to reflect the actual structure of the virtual hard disk 102 by noting which blocks contain data and/or which blocks contain nulls. The virtual hard disk 102', may be stored at a local service 250 (such as local service 250 illustrated in FIG. 1).

Figure 3:
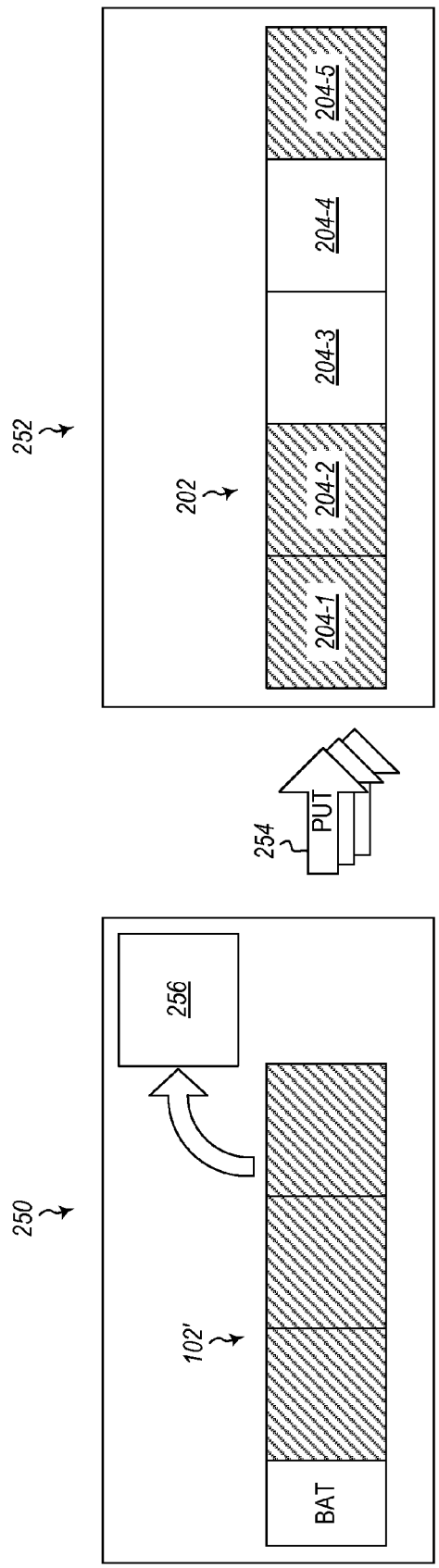
FIG. 3 illustrates a virtual hard disk at a local service and a corresponding blob at a remote service.

Referring now to FIG. 3, a remote blob 202 will likewise be sparse, because the prescribed format is based on a 1-1 mapping of disk pages to blob pages. However, the remote blob at the remote service 252 is not optimized for sparseness but rather includes both blocks containing data 204-1, 204-2 and 204-5 corresponding to the blocks 104-1, 104-2 and 104-5; as well as blocks containing nulls 204-3 and 204-4 corresponding to blocks 104-3 and 104-4 that were optimized away in the virtual hard disk 102'.

FIG. 3 illustrates an example of uploading blocks using a dynamic virtual hard drive. For dynamic VHD, as noted above, the dynamic format contains a data structure known as the BAT. The BAT 106 provides a map of virtual blocks to physical blocks. The map is sparse in that not all virtual blocks have physical data and are understood to be empty. The virtual stream implementation surfaces sparseness data based on the BAT 106. When seeking and reading the virtual stream, the BAT 106 is likewise used. Thus, as illustrated in FIG. 3, HTTP PUT requests 254 can be used to send blocks 104-1, 104-2 and 104-5 containing data as indicated by the BAT 106.

By integrating conversion and upload into the local service 250, the sparseness metadata stored in the BAT 106 in supported input formats is leveraged to improve upload performance. In particular, the sparseness metadata can be used to optimize what data is uploaded from the local service 250 to the remote cloud service 252. Rather than needing to upload an entire virtual hard disk 102, individual blocks containing data, such as blocks 104-1, 104-to in 104-5 can be uploaded to the blob 202 at the remote cloud service 252. For example, one or more HTTP 'PUT' requests 254 can be used to upload the block 104-1 to the block 204-1, the block 104-2 to the block 204-2, and the block 104-5 to the block 204-5.

On-the-fly conversion also improves parallelism, avoiding an otherwise slow up-front operation. For example, the blocks 104-1, 104-2 and 104-5 could each be uploaded to the remote service 252 and the blob 202 using each their own individual PUT request 254 such that the blocks could be uploaded in a parallel fashion.

Further, users do not typically use the 'fixed' virtual hard disk (VHD) formats (such as that illustrated by the virtual hard disk 102) for their virtualization needs. More often, the 'dynamic' and 'differencing' disk VHD formats are used. Dynamic and differencing disks bring numerous manageability benefits, and their use is well-integrated into various tools and operating systems, such as Hyper-V and Windows® 7 available from Microsoft® Corporation of Redmond Wash. On-front conversion to convert a dynamic word differencing disk to a fixed disk such as that illustrated by virtual disk 102, is slow, requires ample local disk space, and yields a duplicative artifact. By integrating conversion from dynamic and differencing disks formats to formats appropriate for the remote blob into the upload tool, users can work directly with their preferred disk format.

Thus, embodiments may implement format-aware uploads with automatic conversion to native cloud formats. Additionally or alternatively, embodiments may retain sparseness end-to-end.

Referring once again to FIG. 1, additional details are illustrated. FIG. 1 illustrates a local service 250. The local service 250 may be, for example, and on premises service maintained by an enterprise. The local service 250 receives a number of inputs. The local service 250 receives a local file path, referring to a virtual hard disk (VHD) file 102-C as generated by Hyper-V, Windows 7, or other compatible tool as an input. The local service 250 receives a remote blob URI, referring to a blob at the remote service 252 such as the blob as illustrated at 202-A, as a hint input. The input may be the remote image name, referring to a remote blob that is registered in a cloud system image repository. The repository enforces a read-only semantic on blobs that are registered as an image. In some embodiments, only blobs with read-only semantics are considered valid input. The input blob is referred to herein as the 'base'.

Embodiments may include modules configured to examine the 'base' remote blob. The remote blob is understood to be a 'fixed'-format virtual hard disk. The footer of the remote blob is parsed to obtain the virtual hard disk 'ID' field. The 'ID' represents the identity of the virtual hard disk file, and will be used later to identify the corresponding local file. A header, such as an MD5 header of the blob, set during a previous upload, is also obtained.

The local service 250 receives storage credentials, enabling the local service 250 to authenticate with a remote storage account at the remote service 252.

Embodiments may include one or more modules 256 at the local service 250 for parsing VHD file formats. The one or more modules 256 parse the local file's header (such as the BAT 106-A) and footer in accordance with a VHD specification, such as the VHD 1.0 specification.

In the example illustrated herein, the VHD is classified as a differencing VHD. An internal abstraction is generated, known as the virtual stream. The virtual stream provides a sparse, seekable view of the virtual hard disk in the native format, such as the format illustrated by the virtual hard disk 102 illustrated in FIG. 2. Input format considerations are encapsulated behind the virtual stream abstraction. Sparseness information is exposed as a list of block addresses understood to contain significant data. For example, as illustrated in FIG. 2, the BAT 106 may identify the blocks 104-1, 104-2, and 104-5 as containing significant data.

FIG. 1 illustrates an example of using differencing VHD functionality for determining which blocks to upload. For differencing VHD, the differencing format is an extension to the dynamic format (such as the dynamic format illustrated at 102' illustrated in FIGS. 2 and 3). It contains a 'parent locator' structure, providing the location of a local parent file. When the BAT 106-A does not contain a mapping for a given virtual block, the parent file may supply the information. The parent file itself may be any type of VHD file. However, if the parent is a differencing file, the process recurses. The virtual stream implementation encapsulates this process. Sparseness data is based on the union of the entire parent tree.

The remote blob 202-A is understood to correspond to a local virtual hard disk file 102-A that is likewise an ancestor of the input file 102-C. The parent tree is traversed to locate the parent file 102-A corresponding to the remote blob 202-A. The parent file 102-A is identified by the 'ID' obtained from the base blob described earlier. Note that the parent file 102-A need not be the immediate parent of the input file 102-C. Any ancestral depth is acceptable.

Embodiments may include modules configured to validate a parent file 102-A. To ensure the integrity of the overall process, a header, such as the MD5 hash of the parent file 102-A is calculated and compared to that obtained from the remote blob 202-A as described earlier. The hash of the parent file 102-A is calculated based on the virtual stream corresponding to the parent file 102-A, not the hash of the parent file 102-A itself, because the MD5 hash on the remote blob reflects its actual content.

Embodiments may include modules configured to determine which blocks are to be uploaded. The determination of which blocks are to be uploaded may based on differences identified at the local service 250.

FIG. 1 illustrates a virtual hard disk file 102-A that is the parent file of a virtual hard disk file 102-B, which is in turn the parent file to virtual hard disk file 102-C. Hard disk files 102-B and 102-C include differences from their parent files, but not redundant data that already exists in their parent files or earlier ancestor files. For data that is the same in the parent and child, reference can simply be made to the parent or an earlier ancestor for that information. In the example illustrated in FIG. 1, the shaded blocks represent data unique to a particular file while the unshaded blocks represent data that can be found in some hierarchical parent (including ancestor) file(s). For example, block 104-2B contains different data than block 104-2A. However, block 104-1B and block 104-1C contain the same data as in block 104-1A. Further, blocks 104-1B and 104-1C do not physically contain the data but rather refer to the parent file 102-A and the block 104-1A where the actual data can be found.

Note also that the differencing format may include BATs for one or more of the files as illustrated in FIG. 1. For example, FIG. 1 illustrates BATs 106-A, 106-B and 106-C. Because of the hierarchical nature of differencing format disks, the sparseness data contained in the BAT 106-A is preserved in the child files 102-B and 102-C. Differencing disks contain a BAT, to indicate that a given block supersedes that of its parent.

Before uploading the virtual hard disk file 102-C to the remote service 252 to the blob 202-C, the remote blob 202-C is initialized. Embodiments may include modules configured to initialize the remote blob 202-C. An update or patch operation does not necessarily mutate the base blob 202-A. Instead, it creates a new blob 202-C whose initial content is copied from the base blob 202-A. The copy may be created using a capability of the remote storage service. After copying the base blob 202-A, further initialization is performed. For each block in the list generated from the previous step—the blocks intended to be uploaded—embodiments clear the corresponding block of the remote blob 202-C. This can be done to facilitate normal 'resume' functionality, which uses the sparseness data to determine which blocks are potentially outstanding. Clearing a block may be a capability of the remote storage service. Clearing a block causes the sparseness of the remote blob to increase.

Illustrating now transferring changes or patches for transferring differences between the file 102-A and the file 102-C, the block 104-2B is moved to the block 204-2C; and the block 104-3C is moved to the block 204-3C the block 104-4B is moved to the block 204-4C. The list of significant blocks, as per the virtual stream abstraction, is subdivided amongst a number of worker threads. Each thread proceeds to seek to an assigned block, read the block, then issue an HTTP PUT request to the remote storage service. The PUT request contains a range header that indicates to the storage service where the block should be placed within the blob. Retries are issued as necessary to recover from transient errors. Eventually, all significant blocks have been transferred and the process terminates.

Embodiments may include modules configured for resuming. Given that an upload may take hours or even days to complete, the client-code component supports resume. The resume process works like the normal upload process, except that the already-uploaded blocks are subtracted from the list of substantial blocks. The list of already-uploaded blocks may obtained from the remote storage service 252. Resuming an upload may be based on querying the remote storage service for sparseness information about the blob; the intersection of those gaps with the block list obtained earlier represents the remaining work. The initialization step of clearing blocks we intend to upload enables this capability.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
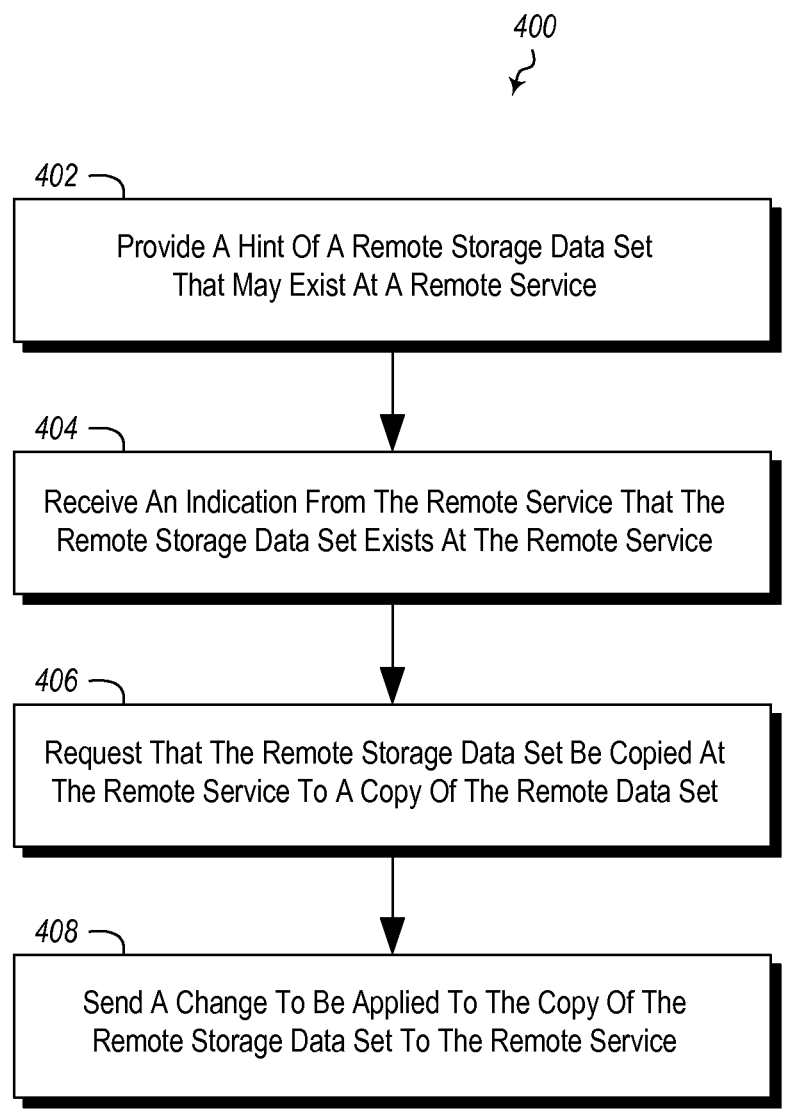
FIG. 4 illustrates a method of updating a remote storage data set.

Referring now to FIG. 4, a method 400 is illustrated. The method includes acts for updating a remote storage data set. The method includes, from a local service providing a hint of a remote storage data set that may exist at a remote service (act 402). For example, the local service 250 may provide a hint regarding the blob 202-A, such as the location of the blob 202-A. The method 400 may be practiced where the remote storage data set is determined from a differencing storage at the local service. For example, the local system 250 can use the hierarchical structure of files to find the file 102-A and to use that information as a hint regarding the blob 202-A.

The method 400 further includes receiving an indication from the remote service that the remote storage data set exists at the remote service (act 404). For example, the remote service 252 may indicate the presence of the blob 202-A.

The method 400 further includes requesting that the remote storage data set be copied at the remote service to a copy of the remote storage data set (act 406). This may result in the blob 202-A being copied to create the blob 202-C.

The method 400 further includes sending a change to be applied to the copy of the remote storage data set to the remote service (act 408). For example, as illustrated in FIG. 1, differences between file 102-A and file 102-C can be determined. The method 400 may be practiced where changes are determined through differencing storage at the local service. In particular, it can be determined that blocks 104-1C, 104-2C, 104-4C, 104-5C in the file 102-C differ from corresponding blocks in file 102-A. This may be determined, for example, by using differencing disk functionality available at the local service 250. The identified differences can be sent to the remote service 252 to be applied to the copied blob 202-C. In some embodiments, blocks can be sent using individual HTTP PUT requests, one for each block.

The method 400 may further include, requesting data set integrity data from the remote service and comparing the data set integrity data with local integrity data. For example, embodiments may examine hashes of data sets (such as an md5 hash) to determine data set integrity. A hash of the file 102-A may be compared to a hash of the blob 202-A as described above.

Embodiments of the method 400 may be performed iteratively until a remote data set is found. In particular, suppose that a local service 250 included a file hierarchy such as the one illustrated in Figure one and suppose that the following occurs prior to the blob 202-C being created. The local service 250 could first attempt to identify the blob corresponding to the file 102-C by sending an appropriate hint. If that was unsuccessful, the local service 250 could attempt to identify a blob corresponding to the file 102-B by sending an appropriate hint. If that were unsuccessful, the local service could attempt to identify a blob corresponding to the local file 102-A. As illustrated in FIG. 1, that attempt would be successful.

Figure 5:
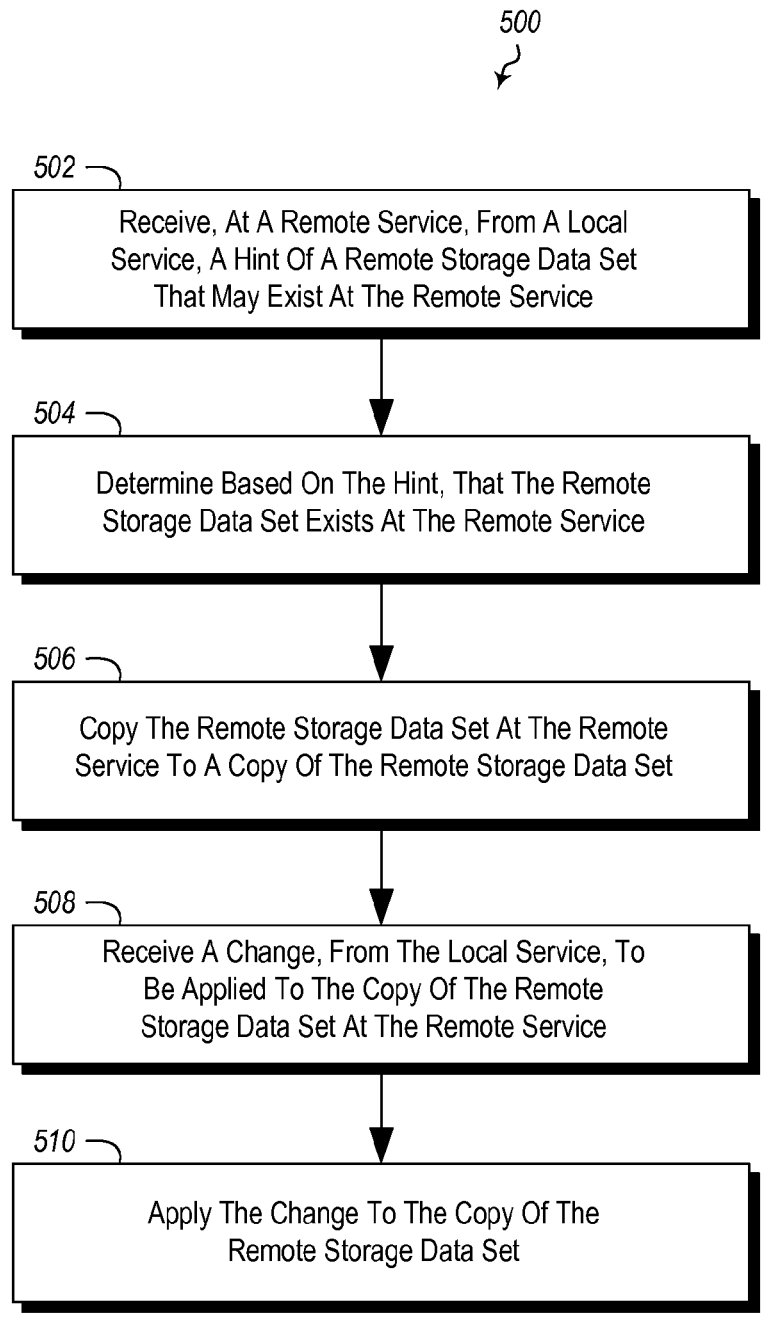
FIG. 5 illustrates another method of updating a remote storage data set.

Referring now to FIG. 5, a method 500 is illustrated. The method 500 includes acts for updating a remote storage data set. The method 500 includes receiving, at a remote service, from a local service, a hint of a remote storage data set that may exist at the remote service (act 502). For example, as illustrated in FIG. 1, the remote service 252 may receive hints regarding the location of various blobs at the remote service 252. In the example illustrated, a hint regarding the location of blob 202-A is received.

The method 500 further includes determining, based on the hint, that the remote storage data set exists at the remote service (act 504);

The method 500 further includes copying the remote storage data set at the remote service to a copy of the remote storage data set (act 506). For example, as illustrated in FIG. 1, the blob 202-A may be copied to the blob at 202-C The method 500 further includes receiving a change, from the local service, to be applied to the copy of the remote storage data set at the remote service (act 508). For example as illustrated in FIG. 1, the local service 250 may send differences between the file 102-A in the file 102-C. As illustrated previously herein, individual blocks of data may be sent and applied to the appropriate blocks in the blob 202-C.

Thus, the method 500 further includes applying the change to the copy of the remote storage data set (act 510).

The method 500 may further include providing data set integrity data from the remote service for the remote storage data set. For example, the method 500 may be practiced where data set integrity data from the remote service and the local integrity data comprise hashes, such as md5 hashes. These hashes can be used to ensure that files at the local service 250 match appropriate blobs at the remote service 252.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of updating a remote storage data set, the method comprising:
   receiving a hint from a local service, of a remote storage data set that may exist at a remote service;
   receiving an indication, from the remote service, that the remote storage data set exists at the remote service;
   requesting that the remote storage data set be copied at the remote service to a copy of the remote storage data set prior to sending any changes to be made to the copy of the remote storage data set; and
   sending a change request corresponding to one or more change to be applied to the copy of the remote storage data set at the remote service, the one or more change corresponding to one or more particular blocks of the copy, sending the change request causing a clearing of one or more blocks from the copy prior to application of the one or more change to the copy, thereby creating sparseness data in the copy, and causing the one or more change to be made to the copy of the remote storage data set when data corresponding to the one or more change is written to the one or more particular blocks of the copy.

2. The method of claim 1 further comprising, requesting data set integrity data from the remote service and comparing the data set integrity data with local integrity data.

3. The method of claim 2, wherein the local integrity data is determined based on local changes to the local data set.

4. The method of claim 2 wherein data set integrity data from the remote service and the local integrity data comprise one or more hashes.

5. The method of claim 2, wherein comparing the data set integrity data with local integrity data is performed to match the data set with a local data set.

6. The method of claim 1, wherein providing a hint of a remote storage data set is performed iteratively by the local service until an appropriate remote data set is found, such that a first hint is provided, followed by a second hint that is different than the first hint after it is determined that the first hint failed to enable the remote service to indicate that the remote storage data set exists.

7. The method of claim 1 wherein changes that are sent from the local service are determined through differencing storage at the local service.

8. The method of claim 1 wherein the remote storage data set is determined from a differencing storage at the local service.

9. A system for updating a remote storage data set, the system comprising:
   one or more processors; and
   one or more computer readable media coupled to the one or more processors, wherein the computer readable media comprise computer executable instructions that when executed by at least one of the one or more processors causes at least one of the one or more processors to perform the following:

receiving, at a remote service, from a local service, a hint of a remote storage data set that may exist at the remote service;

determining, based on the hint, that the remote storage data set exists at the remote service;

copying the remote storage data set at the remote service to a copy of the remote storage data set;

subsequent to copying the remote storage data set into the copy of the remote storage data set, receiving a change request of one or more change, from the local service, to be applied to the copy of the remote storage data set at the remote service, the one or more change corresponding to one or more particular blocks of the copy;

prior to applying the one or more change to the copy, causing a clearing of one or more blocks from the copy, thereby creating sparseness data in the copy; and applying the change to the copy of the remote storage data set by writing data corresponding to the one or more change to the one or more particular blocks of the copy.

10. The system of claim 9, wherein the computer executable instructions are further executable to cause at least one of the one or more processors to provide data set integrity data from the remote service for the remote storage data set.

11. The system of claim 10, wherein data set integrity data from the remote service and the local integrity data comprise one or more hashes.

12. The system of claim 9, wherein receiving, at the remote service, from the local service, a hint of the remote storage data set that may exist at the remote service is performed iteratively until it can be determined, based on the hint, that the remote storage data set exists at the remote service.

13. The system of claim 9, wherein one or more changes associated with the change request are determined through differencing storage at the local service.

14. The system of claim 9, wherein the remote storage data set is determined from a differencing storage at the local service.

15. A system for updating a remote storage data set, the system comprising:

a first computing device that includes one or more first processors that execute a remote service, wherein the remote service comprises one or more remote storage data sets; and a second computing device that includes one or more second processors that execute a local service, wherein the local service:

comprises a hierarchical differencing disk structure configured to identify differences between different hierarchical levels of the differencing disk structure, and wherein the hierarchical differencing disk structure comprises one or more hierarchical levels corresponding to one or more remote storage data sets at the remote service;

is configured to provide hints of remote storage data sets that may exist at the remote service based on information in the hierarchical differencing disk structure;

is configured to request, in one or more requests to copy, that one or more remote storage data sets at the remote service be copied; and is configured to send one or more corresponding requests for changes, as determined by differences in the levels of the hierarchical differencing disk structure, to the remote service to be applied to the one or more copies of the remote storage data sets; and wherein the remote service is:

configured to copy the one or more corresponding copies of the remote storage data sets at the remote service in response to the one or more requests to copy and prior to receiving the one or more corresponding requests for changes received from the local service;

configured to identify and clear one or more blocks of the one or more corresponding copies based on the one or more corresponding requests for changes to thereby create sparseness data in the one or more corresponding copies prior to applying changes defined by the one or more corresponding requests for changes; and configured to apply the changes defined by the one or more corresponding requests for changes received from the local service to the one or more corresponding copies of the remote storage data sets by writing data to the one or more blocks that were cleared based on the one or more corresponding requests for changes.

16. The system of claim 15, wherein the remote service is configured to provide integrity data about the one or more remote storage data sets.

17. The system of claim 16, wherein the integrity data comprises one or more hashes.

18. The system of claim 16, wherein the local service is configured to compare the integrity data with local integrity data.

19. The system of claim 15, wherein the local service is configured to iteratively provide hints to the system service based on different levels in the hierarchical differencing disk structure.

20. The system of claim 9, wherein the computer executable instructions are executable by at least one of the one or more processors to further cause at least one of the one or more processors to perform the following:

querying for the sparseness data in the copy to identify a location where to resume applying changes in the copy of the remote storage data set.

* * * * *